US009341535B2

(12) United States Patent
Gardner et al.

(10) Patent No.: US 9,341,535 B2
(45) Date of Patent: May 17, 2016

(54) PRESSURE BELT COMPRISING REPLACEABLE SENSING ELEMENTS

(71) Applicant: Kulite Semiconductor Products, Inc., Leonia, NJ (US)

(72) Inventors: Robert Gardner, Westwood, NJ (US); Louis DeRosa, Wayne, NJ (US); Joseph VanDeWeert, Maywood, NJ (US); Richard Martin, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 408 days.

(21) Appl. No.: 13/757,970

(22) Filed: Feb. 4, 2013

(65) Prior Publication Data

US 2013/0199302 A1    Aug. 8, 2013

Related U.S. Application Data

(60) Provisional application No. 61/594,749, filed on Feb. 3, 2012.

(51) Int. Cl.
| | |
|---|---|
| *G01L 7/00* | (2006.01) |
| *G01L 19/08* | (2006.01) |
| *G01L 15/00* | (2006.01) |
| *G01L 27/00* | (2006.01) |
| *G01L 19/00* | (2006.01) |

(52) U.S. Cl.
CPC ............... *G01L 19/08* (2013.01); *G01L 15/00* (2013.01); *G01L 19/083* (2013.01); *G01L 27/007* (2013.01); *G01L 19/0084* (2013.01)

(58) Field of Classification Search
CPC ............ G01L 19/0007; G01L 19/0084; G01L 19/147
USPC .......................................................... 73/756
See application file for complete search history.

(56) References Cited

U.S. PATENT DOCUMENTS

| | | | | |
|---|---|---|---|---|
| 5,722,124 | A * | 3/1998 | Wisniewski | 24/295 |
| 6,134,485 | A * | 10/2000 | Tanielian et al. | 701/14 |
| 6,250,149 | B1 * | 6/2001 | Black | 73/178 R |
| 6,568,260 | B2 * | 5/2003 | Hakenesch | 73/178 R |
| 6,766,950 | B2 * | 7/2004 | Hall | 235/400 |
| 2005/0200464 | A1 * | 9/2005 | Bennie | B60C 23/0408 340/442 |

\* cited by examiner

*Primary Examiner* — Lisa Caputo
*Assistant Examiner* — Nathaniel T Woodward
(74) *Attorney, Agent, or Firm* — Troutman Sanders LLP; James E. Schutz; Mark Lehi Jones

(57) ABSTRACT

A pressure belt comprising a flexible belt, and a flat pack assembly removably attached to the flexible belt, wherein each flat pack assembly comprises at least one sensing element. Further, each flat pack assembly also comprises a memory component associated with the sensing element thereon, wherein the memory component houses data specific to the corresponding sensing element. Unlike prior art structures, each flat pack assembly is individually removable. Therefore, if one sensing element malfunctions, it may be replaced by removing the flat pack assembly comprising the malfunctioning sensing element and swapping it out for a flat pack assembly comprising an operable sensing element. This is an improvement over the prior art as it eliminates the need for replacing and recalibrating the entire pressure belt when one sensing element malfunctions, which can be both time consuming and costly.

20 Claims, 5 Drawing Sheets

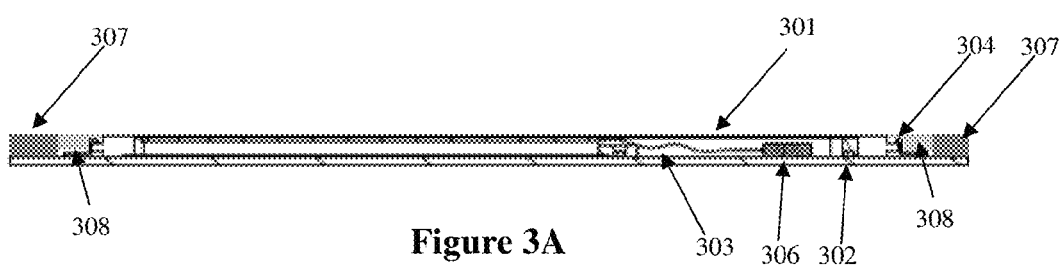
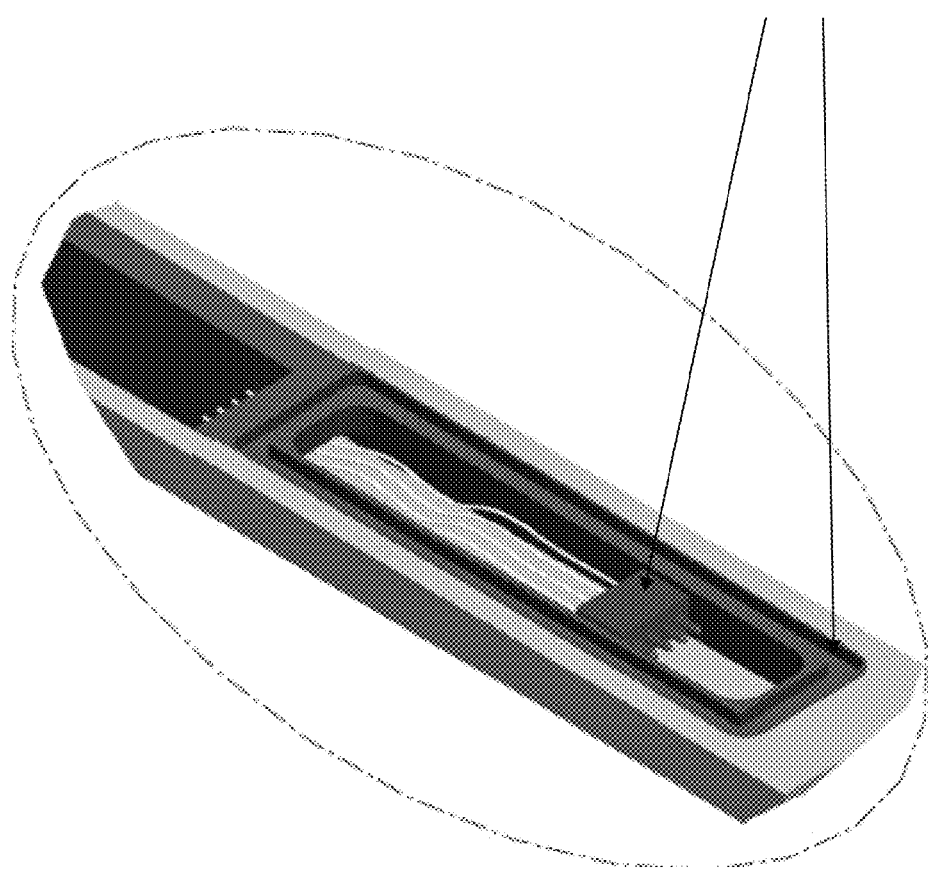
Figure 3A
Figure 3B

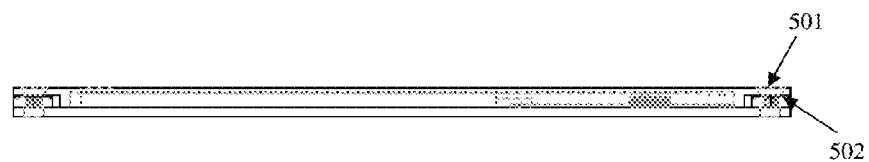
Figure 5
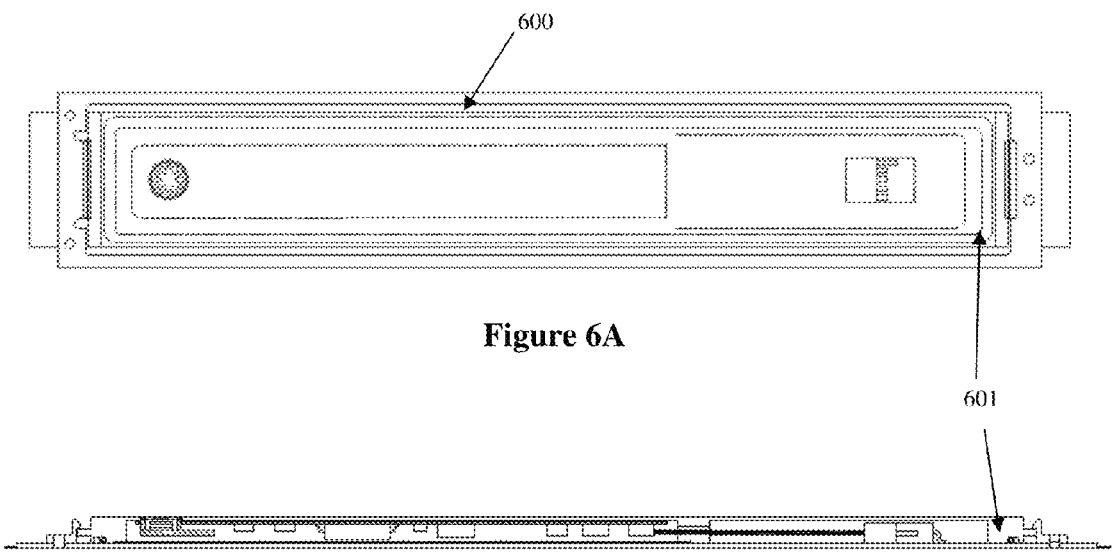
Figure 6A
Figure 6B

PRESSURE BELT COMPRISING REPLACEABLE SENSING ELEMENTS

CROSS-REFERENCE TO RELATED APPLICATIONS

This application claims priority to U.S. Provisional Patent Application No. 61/594,749, filed Feb. 3, 2012, the contents of which are hereby incorporated by reference as it fully set forth below.

TECHNICAL FIELD

The present invention relates to pressure belts comprising a plurality of replaceable pressure transducer assemblies, wherein the pressure belt is configured to attach to curved surfaces, such as the wing of an aircraft.

BACKGROUND

The measurement of air pressure along the surface of an aircraft wing during flight testing is a critical measurement for the design and testing of new aircraft. This measurement, however, is difficult to carry out without disturbing the airflow around the surface, which consequently reduces the accuracy of the measurement and makes the measurement less useful. One common method of measuring air pressure along the surface of an aircraft is to drill holes in the surface and implant recessed pressure transducers inside the surface body. This method is difficult and expensive to carry out and weakens the aircraft's structural integrity. Another common method is to place a very thin (approximately 0.2 inches), flat pack pressure transducer on the surface. A plastic ferring or RTV can then be used to smooth the transition from the aircraft surface to the transducer which minimizes air flow disturbance.

U.S. Pat. No. 6,134,485 describes a pressure belt comprising a series of transducers mounted on a flexible substrate and can further comprise integrated electronics. The belt can then be glued to the surface of the aircraft which minimizes air flow disturbance and allows for the quick measurement of multiple pressures along the surface. One problem with this pressure belt, however, is that the transducers are fixed to the flexible substrate, making it very difficult and time consuming to switch out a single malfunctioning transducer. To replace one transducer, the entire belt must be removed from the aircraft, the malfunctioning transducer must be changed, and then the belt must be recompensated and reinstalled, which is both time consuming and costly It is thus desirable to create a pressure belt that comprises a series of removable transducers to avoid having to remove and reinstall an entire pressure belt when one transducer stops working, wherein the pressure belt still maintains the thin and water-resistant properties that are important for operation. It is to this need that the present invention is directed.

BRIEF SUMMARY

Embodiments of the present invention provide a pressure belt, comprising a flexible belt; a first flat pack assembly removably attached to the flexible belt at a first location; a sensing element disposed on the first flat pack assembly; and a memory component, for storing data corresponding to the sensing element, disposed on the first flat pack assembly.

Other embodiments of the present invention provide a system for utilizing a pressure belt, comprising a first flat pack assembly removably attached to a flexible belt; a first sensing element disposed on the first flat pack assembly adapted to output a first signal indicative of a first sensed condition, and a first memory component disposed on the first flat pack assembly adapted to output first sensor data that corresponds to the first sensing element; and a microprocessor adapted to receive the first signal and the first sensor data, determine an adjusted first signal based on at least the first signal and the first sensor data, and output the adjusted first signal to a data storage device.

Other embodiments of the present invention provide a method for detecting pressure on a pressure belt, comprising receiving first sensor data from a first memory component; receiving a first signal indicative of a first sensed condition from a first sensor on a first flat pack assembly at a first time; determining an adjusted first signal based on the first signal and the first sensor data; outputting the adjusted first signal to a data storage unit; receiving second sensor data from a second memory component; receiving a second signal indicative of a second sensed condition from a second sensor on a second flat pack assembly at a second time; determining an adjusted second signal based on the second signal and the second sensor data; and outputting the adjusted second signal to the data storage unit; wherein the second flat pack assembly replaces the first flat pack assembly after the first time but before the second time.

BRIEF DESCRIPTION OF THE DRAWINGS

FIGS. 3A and 3B illustrate side and top views, respectively, of an exemplary flat pack assembly of the present invention comprising a sensing element.

FIG. 5 illustrates a side view of another exemplary embodiment of a flat pack assembly of the prevention invention.

FIGS. 6A and 6B illustrate top and side perspective views, respectively, of yet another exemplary embodiment of a flat pack assembly of the present invention.

DETAILED DESCRIPTION

Figure 1A:
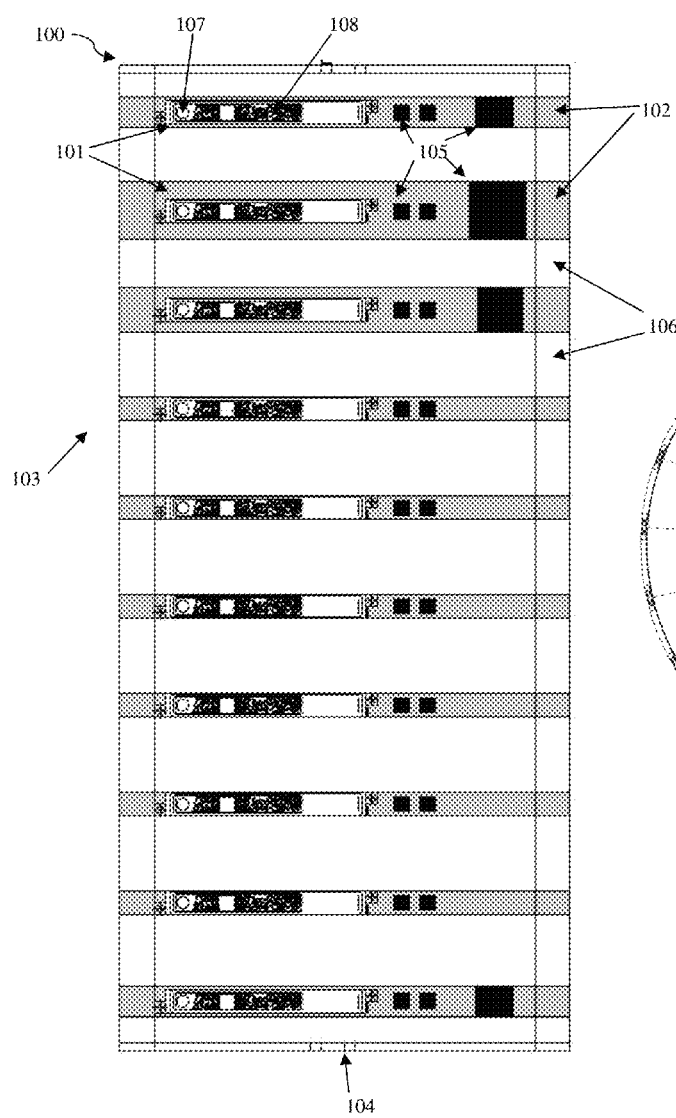
FIG. 1A illustrates an exemplary pressure belt of the present invention comprising a plurality of removable sensing elements.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an," and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical pressure sensor assemblies and chip-package assemblies and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

Embodiments of the present invention provide a pressure belt comprising a flexible belt, and a flat pack assembly removably attached to the flexible belt, wherein each flat pack assembly comprises at least one sensing element. Further, each flat pack assembly also comprises a memory component associated with the sensing element, wherein the memory component houses data specific to the corresponding sensing element.

The flexibility of the flexible belt allows the flexible belt to be wrapped around curved surfaces, for example, aircraft wings. Further, the flexible belt of the present invention is thin enough to avoid interference with an incoming pressure source. Unlike prior art structures, each flat pack assembly is individually removable. Therefore, if one sensing element malfunctions, it may be replaced by removing the flat pack assembly comprising the malfunctioning sensing element and swapping it out for a flat pack assembly comprising an operable sensing element. This is an improvement over the prior art as it eliminates the need for replacing and recalibrating the entire pressure belt when one sensing element malfunctions, which can be both time consuming and costly.

Referring to FIG. 1A, there is shown a flexible belt (100) comprising a plurality of removable flat pack assemblies (101), wherein each flat pack assembly (101) houses at least one sensing element. Even more specifically, each flat pack assembly (101) may comprise a transducer (107) and electronic components (108) associated with processing signals from the transducers. It shall be understood an exemplary embodiment may comprise pressure transducers, however transducers and other sensing elements configured to measure other parameters, e.g., temperature, may also be used. Further, a flat pack assembly (101) may comprise more than one type of sensing element. For example, an individual flat pack assembly (101) may comprise both a pressure and temperature sensing element. Additionally, each flat pack assembly (101) of a plurality of flat pack assemblies attached the flexible belt (100) may comprise different sensing elements. For example, one flat pack assembly (101) may comprise a pressure sensing element, and another flat pack assembly (101) mounted on the same flexible belt (100) may comprise a temperature sensing element. It shall be understood that various combinations thereof are also contemplated herein.

Each flat pack assembly (101) is removably attached to a rigid portion (102). This securely locks the flat pack assemblies (101) into place during use, but also allows for their individual removal should they need to be replaced. Further, the rigid portion (102) provides structural integrity to each flat pack assembly (101). Additionally the rigid portion allows for placement of additional electronic components such as a voltage regulator, microprocessor, and Ethernet transceiver (105). To maintain the flexible characteristics of the overall pressure belt (100), however, flexible areas may be placed between each rigid portion (102) to allow for a smooth fit around curves.

Figure 1B:
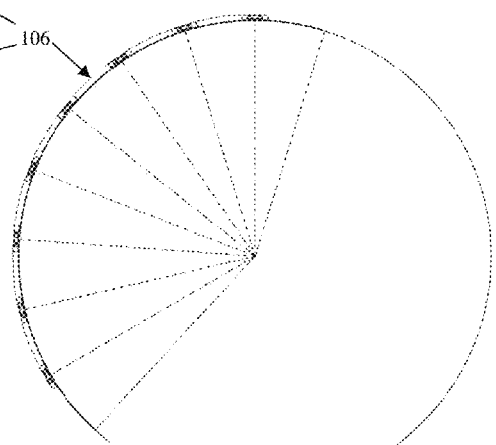
FIG. 1B illustrates an exemplary pressure belt of the present invention wrapped around a curved surface.

The pressure belt of the present invention, may further comprise a plurality of segments. As illustrated in FIG. 1A, there is shown a first segment (103) of the pressure belt. It shall be understood that the first segment (103) can be connected to additional segments using connectors at either end of the segment (104) depending on the specific application, which allows for pressure belt tuning to address the needs of a specific application. For example, some applications may require one segment, whereas other applications may require a plurality of segments connected together. Referring to FIG. 1B, there is shown one segment of the pressure belt wrapped around a radius of curvature. As illustrated, the pressure belt segment is able to wrap smoothly around a curved surface.

Figure 2:
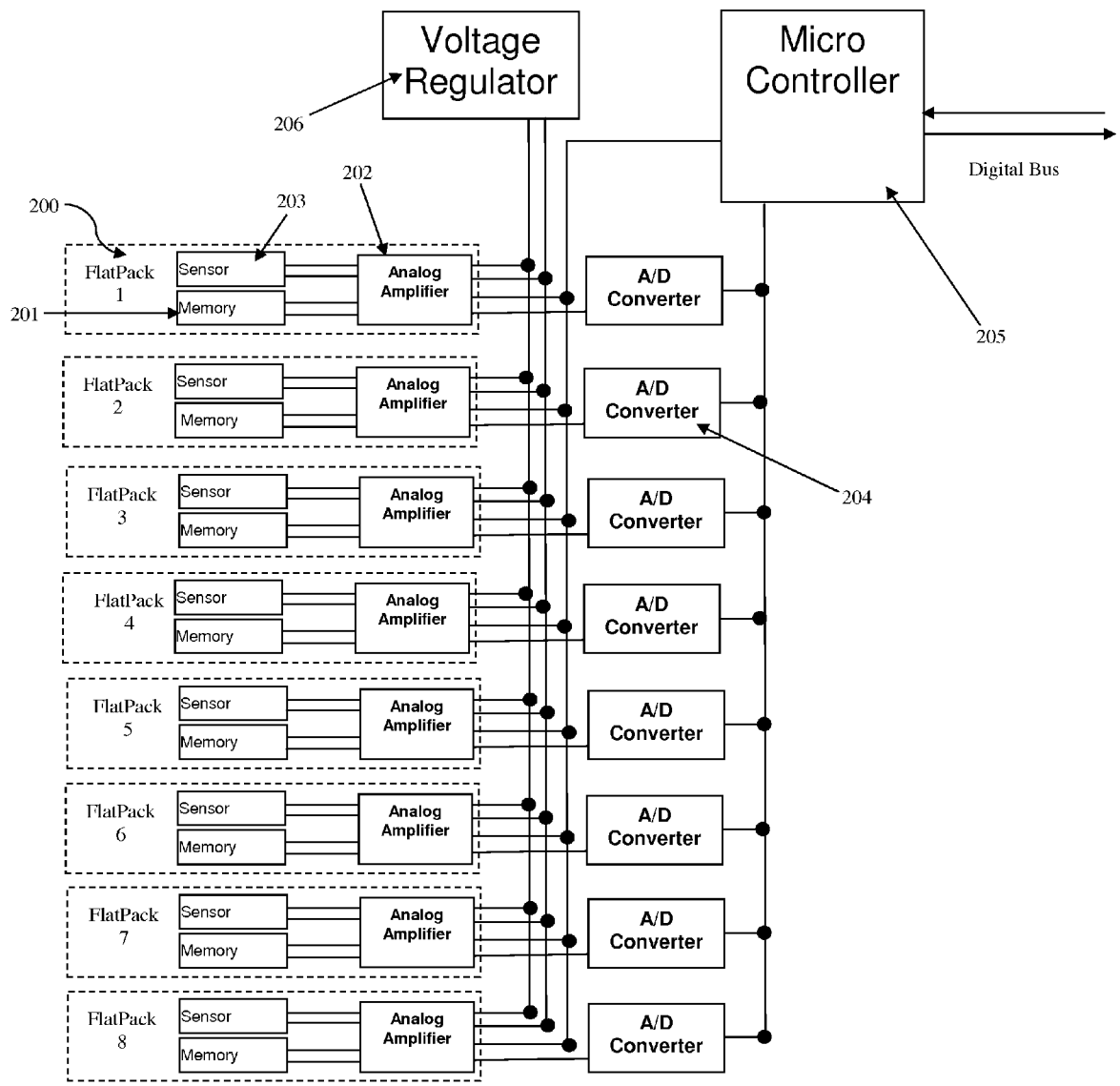
FIG. 2 shows an electronic configuration of an exemplary pressure belt comprising a plurality of removable sensing elements.

Referring to FIG. 2, there is shown an electronic configuration of the pressure belt comprising a plurality of flat pack assemblies (200). As illustrated, each flat pack assembly (200) comprises a sensing element (203), a memory component (201), and an analog amplifier (202). It shall be understood that the illustration provides one exemplary embodiment. In another example, the flat pack assembly (200) may comprise a plurality of sensing elements (203). Further, each flat pack assembly (200) on the flexible belt of the pressure belt may comprise a different number and/or type of sensing elements (203). It shall be further understood that the number of sensing elements (203) per flat pack assembly is dependent upon system configuration, ease of removal and replaceability, and cost.

The "on-board" memory component (201) comprises data specific to the corresponding sensing element (203), for example but not limited to, calibration and sensor identification data, and thus allows for individual flat pack assemblies (200) to be removed and replaced without having to reconfigure and/or recalibrate the entire flexible belt segment, which is further described below. It also enables various pressure ranges and flat pack assembly configurations to be used on a single pressure belt.

As previously described, the sensing elements (203) are housed in individual flat pack assemblies (200) and each flat pack assembly (200) may also comprise an electronic memory component (201) (generally in the form of EEPROM) and a fixed or programmable gain amplifier (202). As pressure and/or temperature, or another condition is applied, the sensing element (203) outputs a signal indicative of the sensed condition and the memory component (201) outputs data unique to the sensing element (203), for example, calibration data, temperature and/or pressure compensation coefficients, etc. The signal from the sensing element (203) may be routed to an analog amplifier (202) and then to an analog to digital converter (204) that may be housed on a main board of the pressure belt, this data may then sent to the microprocessor. The data from the memory component (201) may be routed directly to the microprocessor or through a programmable gain amplifier to the microprocessor. Further, a power source (206), for example, a voltage regulator may be used to power the system. From the analog to digital converter (204), the digital signal and data information may be routed to a microprocessor (205). Based on the information the microprocessor (205) receives, it may perform digital filtering and compensation techniques for each of the plurality of sensing elements (203) on a segment of the pressure belt structure as instructed by the memory component. The microprocessor then relays the information via Ethernet or another appropriate digital bus means to a main data storage housed on the overall device, for example, an aircraft device. In this way, multiple segments can be chained together to measure many pressure, temperature, or other sensed condition points over a wide area of the aircraft's wing.

In the event that a sensing element (203) malfunctions and needs to be replaced, the flat pack assembly (200) comprising the malfunctioning sensing element (203) may be easily replaced without having to disturb the other, properly-functioning sensing elements (203) on other flat pack assemblies (200). Further, the on-board memory (203) may enable a new flat pack assembly (200) comprising a new or replaced sensing element (203) to be placed onto the flexible belt and enables the pressure belt to automatically recognize the new flat pack assembly (200) and begin acquiring data from the new sensing element (203). The on-board memory (203) may store, for example, the serial number, pressure and/or temperature range, and thermal characteristics of the sensing element (203) so that there is no need to compensate or calibrate the pressure belt after the new flat pack assembly (200) is installed, which provides an improvement over the prior art.

It shall be understood that each flexible belt comprises corresponding connections to both electrically and physically connect to the individual flat pack assemblies. Referring to FIGS. 3A and 3B, there is shown side and top perspective views, respectively, of these connections. As illustrated, an electrical connector (306) may be disposed underneath an overhang of a flat pack assembly (301). In example embodiments, the electrical connector (306) may comprise three or four connections for powering in, signaling out, and to provide a digital line to read the on-board memory. Additionally, a groove (302) may be defined around the electrical connector (306), which may further accommodate a gasket that surrounds and seals the electrical connector (306) inside a water tight cavity. One skilled in the art will appreciate that electrical connectors may be susceptible to water damage, and thus benefit from such a sealing mechanism as water may short out the individual connections on the electrical connector (306). A sealant may also be applied to the connections of the electrical connector (306) to further protect the connections from water damage.

There are many ways to physically connect the flat pack assembly (301) to the flexible belt. As previously described, each flat pack assembly may be removably attached to the flexible belt. In an exemplary embodiment, the flexible belt may comprise a plurality of flat pack receptacles configured to receive individual flat pack assemblies (301). For example, the flat pack receptacles may be recessed cavities defined on the flexible belt.

There are many ways to connect the flat pack assembly (301) to the flexible belt. In the various embodiments, each flexible belt is configured to press-fit or clipped into the predefined cavities on the flexible belt. This press-fit technique eliminates the need for soldering techniques often used in the prior art. In this way, if a flat pack assembly (301) housed within a first predefined cavity of the flexible belt comprises a malfunctioning sensing element, the flat pack assembly may be easily removed and replaced with another flat pack assembly without replacing the entire pressure belt structure.

In an exemplary embodiment, miniature spring loaded clips (304) may be used to removably attach each flat pack assembly (301) to the flexible belt, such that when the flat pack assembly (301) is pushed down, the spring loaded clips (304) flex backwards and allow the flat pack assembly (301) to move downward. The spring loaded clips (304) then close, holding the flat pack assembly (301) firmly down onto the flexible belt. It shall also be understood that the spring loaded clips (304) and the groove (302) with the gasket embedded therein, described above, work together so that as the flat pack assembly (301) is pressed into place, the groove (302) comprising the gasket effectively seals the electrical connector (306) and the elasticity of the gasket consequently provides an upward force that holds the flat pack assembly (301) tightly against the clips. In this example, the spring loaded clips (304) may be covered with a covering (308) that further enables smooth airflow over the pressure belt may be installed after installation of the flat pack assemblies. The covering (308) may be installed after installation of the flat pack assembly (301). Further, a rubber sheet (307) may cover the remaining portions of other circuitry and may define cutouts that allow the surface of the pressure belt structure to be of a uniform thickness without hindering flexibility.

Figure 4A:
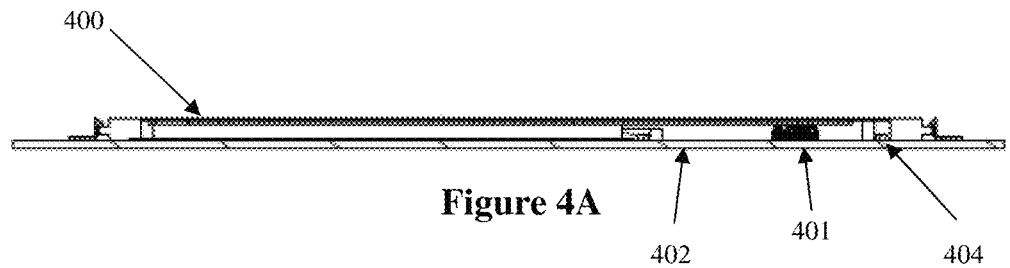
FIGS. 4A and 4B illustrate side and top views, respectively, of another exemplary embodiment of a flat pack assembly of the present invention comprising a sensing element.
Figure 4B:

Referring to FIGS. 4A and 4B, there is shown side and top perspective views, respectively, of another exemplary embodiment. In this embodiment, the flat pack assembly (400) may be electrically connected to the flexible belt using spring loaded pins (401). The spring loaded pins (401) may be soldered onto a rigid portion (402) of the flexible belt. Further, each flat pack assembly (400) may comprise corresponding regions defined on a circuit board (403) such that when the flat pack assembly (400) is inserted into place, side clips hold the flat pack assembly (400) down therefore enabling the spring loaded pins to make electrical and physical contact with the flat pack assembly (400). The spring loaded pins (401) may then subsequently be sealed from moisture with a gasket (404). Referring to FIG. 5, there is shown a side view of an exemplary embodiment of the present invention wherein the side clips, described above, are replaced by miniature screws (501). The nuts (305) for these screws are fixed to the rigid portion of the flexible belt such that when the screws are tightened, each flat pack assembly (400) is held firmly in place and the gasket is compressed to provide sealing.

Referring to FIGS. 6A and 6B, there is shown top and side perspective views, respectively, of another flat pack assembly embodiment. In this embodiment, a gasket (601) may be disposed around the entire edge of the flat pack assembly (600). The gasket (601) in this exemplary embodiment may be used with individual spring loaded pins or with a multi-pin connector. Further, the gasket (601) prevents water from getting between the flat pack assembly (600) and the rigid part of the flexible belt.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:

1. A pressure belt, comprising:
   a flexible belt;
   a first flat pack assembly removably attached to the flexible belt at a first location, the first flat pack assembly comprising:
      a sensing element; and
      a memory component associated with the sensing element and storing sensor data corresponding to the sensing element; and
   a press-fit fastener configured to removably attach the first flat pack assembly to the flexible belt;
   wherein the first flat pack assembly is configured such that the sensing element and the associated memory component are integrated with the first flat pack assembly.

2. The pressure belt of claim 1, further comprising a second flat pack assembly removably attached to the flexible belt at a second location.

3. The pressure belt of claim 2, wherein the first location and the second location are spaced apart such that flexible portions are disposed therebetween.

4. The pressure belt of claim 2, further comprising a first predefined region at the first location configured to house the first flat pack assembly and a second predefined region at the second location configured to house the second flat pack assembly.

5. The pressure belt of claim 1, further comprising an electrical connector disposed on the first flat pack assembly adapted to electrically connect the first flat pack assembly to the flexible belt.

6. The pressure belt structure of claim 5, further comprising a gasket surrounding the electrical connector adapted to sealing the electrical connector from external environments.

7. The pressure belt of claim 1, wherein the press-fit fastener comprises a spring loaded clip.

8. The pressure belt of claim 1, wherein spring loaded pins electrically connect the first flat pack assembly to the flexible belt.

9. The pressure belt of claim 8, further compromising a gasket surrounding the spring loaded pins to seal the pins from the external environment.

10. The pressure belt of claim 1, further comprising a gasket surrounding an external edge of the first flat pack assembly.

11. A system for utilizing a pressure belt, comprising:
    a press-fit fastener;
    a first flat pack assembly removably attached to a flexible belt by the press-fit fastener;
    a first sensing element disposed on the first flat pack assembly adapted to output a first signal indicative of a first sensed condition;
    a first memory component comprising first sensor data, the first sensor data comprising sensor data specific to the corresponding sensing element, the first memory component disposed on the first flat pack assembly and adapted to output the first sensor data that corresponds to the first sensing element, wherein the first flat pack assembly is configured such that the sensing element and the associated memory component are integrated with the first flat pack assembly; and
    a microprocessor adapted to receive the first signal and the first sensor data, determine an adjusted first signal based on at least the first signal and the first sensor data, and output the adjusted first signal to a data storage device.

12. The system of claim 11, further comprising:
    a second flat pack assembly removably attached to the flexible belt;
    a second sensing element disposed on the second flat pack assembly adapted to output a second signal indicative of a second sensed condition, and a second memory component disposed on the second flat pack assembly adapted to output second sensor data that corresponds to the second sensing element; and
    wherein the microprocessor is adapted to receive the second signal and the second sensor data, determine an adjusted second signal based on at least the second signal and the second sensor data, and output the adjusted second signal to the data storage device.

13. The system of claim 12, wherein the first sensing element is a pressure sensor and the second sensing element is a temperature sensor.

14. The system of claim 12, wherein the first sensed condition is pressure and the second sensed condition is temperature.

15. The system of claim 11, wherein the first sensor data includes calibration data.

16. The system of claim 11, wherein the sensor data includes a serial number.

17. A method for detecting pressure on a pressure belt, comprising:
    receiving first sensor data comprising sensor data from a first memory component disposed on a first removably attached flat pack assembly, wherein the first removably attached flat pack assembly is configured such that a sensing element and the first memory component are integrated with the first removably attached flat pack assembly;
    receiving a first signal indicative of a first sensed condition from a first sensor on the first removably attached flat pack assembly at a first time;
    determining an adjusted first signal based on the first signal and the first sensor data;
    outputting the adjusted first signal to a data storage unit;
    replacing, by a press-fit fastener, the first flat pack assembly with a second flat pack assembly;
    receiving second sensor data from a second memory component;
    receiving a second signal indicative of a second sensed condition from a second sensor on the second flat pack assembly at a second time;
    determining an adjusted second signal based on the second signal and the second sensor data; and
    outputting the adjusted second signal to the data storage unit;
    wherein the first time is before the second time.

18. The method of claim 17, wherein the first sensor data and the second sensor data includes calibration data.

19. The method of claim 17, wherein the first sensor data and the second sensor data includes sensor identification data.

20. The method of claim 17, wherein the first signal is indicative of pressure and the second signal is indicative of temperature.

* * * * *